(12) United States Patent
Chatterji et al.

(10) Patent No.: US 7,255,170 B2
(45) Date of Patent: *Aug. 14, 2007

(54) FOAMED CEMENT COMPOSITIONS, ADDITIVES, AND ASSOCIATED METHODS

(75) Inventors: Jiten Chatterji, Duncan, OK (US); D. Chad Brenneis, Marlow, OK (US); Bobby J. King, Duncan, OK (US); Roger S. Cromwell, Walters, OK (US); Dennis W. Gray, Comanche, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 125 days.

This patent is subject to a terminal disclaimer.

(21) Appl. No.: 11/132,803

(22) Filed: May 19, 2005

(65) Prior Publication Data

US 2006/0016602 A1   Jan. 26, 2006

Related U.S. Application Data

(63) Continuation-in-part of application No. 10/899,325, filed on Jul. 26, 2004, now Pat. No. 7,013,975.

(51) Int. Cl.
*E21B 33/13*   (2006.01)
*E21B 33/138*  (2006.01)

(52) U.S. Cl. ............ 166/293; 166/292; 166/309; 106/646; 106/677; 507/202

(58) Field of Classification Search ............ None
See application file for complete search history.

(56) References Cited

U.S. PATENT DOCUMENTS

| | | | |
|---|---|---|---|
| 4,741,782 A | 5/1988 | Styron |
| 5,079,036 A | 1/1992 | Roe et al. |
| 5,133,409 A | 7/1992 | Bour et al. |
| 5,147,565 A | 9/1992 | Bour et al. |
| 5,275,654 A | 1/1994 | Cowan |
| 5,588,489 A | 12/1996 | Chatterji et al. |
| 5,696,059 A | 12/1997 | Onan et al. |
| 5,711,801 A | 1/1998 | Chatterji et al. |
| 5,897,699 A | 4/1999 | Chatterji et al. |
| 6,063,738 A | 5/2000 | Chatterji et al. |
| 6,202,751 B1 | 3/2001 | Chatterji et al. |
| 6,210,476 B1 | 4/2001 | Chatterji et al. |
| 6,220,354 B1 | 4/2001 | Chatterji et al. |
| 6,227,294 B1 | 5/2001 | Chatterji et al. |
| 6,244,343 B1 | 6/2001 | Brothers et al. |
| 6,273,191 B1 | 8/2001 | Reddy et al. |
| 6,332,921 B1 | 12/2001 | Brothers et al. |
| 6,336,505 B1 | 1/2002 | Reddy |
| 6,364,945 B1 | 4/2002 | Chatterji et al. |
| 6,367,550 B1 | 4/2002 | Chatterji et al. |
| 6,390,195 B1 | 5/2002 | Nguyen et al. |
| 6,454,004 B2 | 9/2002 | Reddy et al. |
| 6,454,008 B1 | 9/2002 | Chatterji et al. |
| 6,457,524 B1 | 10/2002 | Roddy |
| 6,478,868 B1 | 11/2002 | Reddy et al. |
| 6,500,252 B1 | 12/2002 | Chatterji et al. |
| 6,516,883 B1 | 2/2003 | Chatterji et al. |
| 6,547,871 B2 | 4/2003 | Chatterji et al. |
| 6,555,505 B1 | 4/2003 | King et al. |
| 6,592,660 B2 | 7/2003 | Nguyen et al. |
| 6,619,399 B1 | 9/2003 | Chatterji et al. |
| 6,630,021 B2 | 10/2003 | Reddy et al. |
| 6,662,873 B1 | 12/2003 | Nguyen et al. |
| 6,668,927 B1 | 12/2003 | Chatterji et al. |
| 6,689,208 B1 | 2/2004 | Brothers |
| 6,698,519 B2 | 3/2004 | Nguyen et al. |
| 6,715,553 B2 | 4/2004 | Reddy et al. |
| 6,722,433 B2 | 4/2004 | Brothers et al. |
| 6,722,434 B2 | 4/2004 | Reddy et al. |
| 6,734,146 B2 | 5/2004 | Chatterji et al. |
| 6,739,806 B1 | 5/2004 | Szymanski et al. |
| 6,951,249 B1 * | 10/2005 | Chatterji et al. ............ 166/293 |
| 7,013,975 B2 * | 3/2006 | Chatterji et al. ............ 166/293 |
| 2002/0035951 A1 | 3/2002 | Chatterji et al. |
| 2003/0000428 A1 | 1/2003 | Chatterji et al. |
| 2004/0016371 A1 | 1/2004 | Chatterji et al. |

FOREIGN PATENT DOCUMENTS

| | | |
|---|---|---|
| EP | 1 201 618 A2 | 5/2002 |
| EP | 1 238 952 A1 | 9/2002 |

OTHER PUBLICATIONS

Halliburton brochure entitled "AQF-2 Foaming Agent" dated 1999.
Halliburton brochure entitled "Howco-Suds Surfactant" dated 1999.
Foreign communication from a related counterpart application dated Dec. 28, 2005.

* cited by examiner

*Primary Examiner*—Zakiya Bates
*Assistant Examiner*—Angela DiTrani
(74) *Attorney, Agent, or Firm*—Craig W. Roddy; Fletcher Yoder

(57) ABSTRACT

Exemplary embodiments relate to cementing operations and, more particularly, to foamed cement compositions, foaming and stabilizing additives, and associated methods. A foaming and stabilizing additive, that comprises a mixture of an alkali salt of an alkyl ether sulfate surfactant, wherein the alkali salt of the alkyl ether sulfate surfactant comprises a mixture of an alkali salt of a $C_{6-10}$ alkyl ether sulfate surfactant, and an alkali salt of a $C_{2-4}$ alkyl ether sulfate surfactant, an alkyl or alkene amidopropyl betaine surfactant, an alkyl or alkene amidopropyl dimethylamine oxide surfactant, sodium chloride, and water, is provided. Also provided are foamed cement compositions that comprise the foaming and stabilizing additive, and associated methods.

23 Claims, No Drawings

FOAMED CEMENT COMPOSITIONS, ADDITIVES, AND ASSOCIATED METHODS

CROSS-REFERENCE TO RELATED APPLICATION

This application is a continuation-in-part of U.S. application Ser. No. 10/899,325 filed on Jul. 26, 2004 now U.S. Pat. No. 7,013,975, which is incorporated herein by reference.

BACKGROUND

The present invention relates to cementing operations and, more particularly, to foamed cement compositions, foaming and stabilizing additives, and associated methods.

Foamed cement compositions may be utilized in cementing operations above ground (e.g., in the construction industry), as well as in subterranean cementing operations. Heretofore, foamed cement compositions have included foaming and stabilizing additives which include components such as isopropyl alcohol that may negatively impact aquatic life. In addition, one or more of the components are often flammable, thereby increasing the expense of shipping the foaming and stabilizing additives. Thus, there is a need for foamed hydraulic cement slurries which include foaming and stabilizing additives that may pose less environmental risk and do not include flammable components.

In subterranean cement operations, in primary well cementing, foamed cement compositions may be used to cement off-shore, deep-water wells wherein they may encounter temperatures varying between about 40° F. to about 50° F. The foamed cement compositions may be pumped into the annular spaces between the walls of the well bores and the exterior surfaces of pipe strings disposed therein. The foamed cement compositions are relatively compressible which prevents the inflow of undesirable fluids into the annular spaces. The foamed cement slurries set therein to form annular sheaths of hardened cement. The annular cement sheaths physically support and position the pipe strings in the well bores and bond the exterior surfaces of the pipe strings to the walls of the well bores preventing the undesirable migration of fluids between areas of the formation penetrated by the well bore. Foamed cement compositions also may be used in remedial cementing operations, such as plugging well bores, plugging highly permeable zones or fractures in well bores, plugging cracks and holes in pipe strings, and the like.

SUMMARY

The present invention relates to cementing operations and, more particularly, to foamed cement compositions, foaming and stabilizing additives, and associated methods.

An embodiment of the present invention provides a foamed cement composition. An example of such a foamed cement composition of the present invention may comprise a hydraulic cement; water; a gas; and a foaming and stabilizing additive comprising a mixture of an alkali salt of an alkyl ether sulfate surfactant, wherein the alkali salt of the alkyl ether sulfate surfactant comprises a mixture of an alkali salt of a $C_{6-10}$ alkyl ether sulfate surfactant, and an alkali salt of a $C_{2-4}$ alkyl ether sulfate surfactant, an alkyl or alkene amidopropyl betaine surfactant, an alkyl or alkene amidopropyl dimethylamine oxide surfactant, sodium chloride, and water.

Another embodiment of the present invention provides a foaming and stabilizing additive. An example of such a foaming and stabilizing additive of the present invention may comprise a mixture of an alkali salt of an alkyl ether sulfate surfactant, wherein the alkali salt of the alkyl ether sulfate surfactant comprises a mixture of an alkali salt of a $C_{6-10}$ alkyl ether sulfate surfactant, and an alkali salt of a $C_{2-4}$ alkyl ether sulfate surfactant, an alkyl or alkene amidopropyl betaine surfactant, an alkyl or alkene amidopropyl dimethylamine oxide surfactant, sodium chloride, and water.

Another embodiment of the present invention provides a method of cementing. An example of such a method of the present invention may comprise providing a foamed cement composition that comprises a hydraulic cement, water, a gas, and a foaming and stabilizing additive of the present invention that comprises mixture of a mixture of an alkali salt of an alkyl ether sulfate surfactant, wherein the alkali salt of the alkyl ether sulfate surfactant comprises a mixture of an alkali salt of a $C_{6-10}$ alkyl ether sulfate surfactant, and an alkali salt of a $C_{2-4}$ alkyl ether sulfate surfactant, an alkyl or alkene amidopropyl betaine surfactant, an alkyl or alkene amidopropyl dimethylamine oxide surfactant, sodium chloride, and water; placing the foamed cement composition in a location to be cemented; and allowing the foamed cement composition to set.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, to foamed cement compositions, foaming and stabilizing additives, and associated methods.

A foamed cement composition of the present invention comprises a hydraulic cement; water; a gas; and a foaming and stabilizing additive comprising a mixture of an alkali salt of an alkyl ether sulfate surfactant, wherein the alkali salt of the alkyl ether sulfate surfactant comprises a mixture of an alkali salt of a $C_{6-10}$ alkyl ether sulfate surfactant, and an alkali salt of a $C_{2-4}$ alkyl ether sulfate surfactant, an alkyl or alkene amidopropyl betaine surfactant, an alkyl or alkene amidopropyl dimethylamine oxide surfactant, sodium chloride, and water.

A variety of hydraulic cements may be utilized in accordance with the present invention, including, but not limited, to those comprised of calcium, aluminum, silicon, oxygen, and/or sulfur, which set and harden by reaction with water. Suitable hydraulic cements, include, but are not limited to, Portland cements, pozzolana cements, gypsum cements, high alumina content cements, slag cements, and silica cements, and combinations thereof. In certain embodiments, the hydraulic cement may comprise a Portland cement. In some embodiments, the Portland cements that are suited for use in the present invention are classified as Class A, C, H, and G cements according to American Petroleum Institute, *API Specification for Materials and Testing for Well Cements*, API Specification 10, Fifth Ed., Jul. 1, 1990.

The water used in the cement compositions of the present invention may be freshwater, saltwater (e.g., water containing one or more salts dissolved therein), brine (e.g., saturated saltwater produced from subterranean formations), or seawater, or combinations thereof. Generally, the water may be from any source, provided that it does not contain an excess of compounds that may adversely affect other components in the cement composition. The water may be present in an amount sufficient to form a pumpable slurry. More particularly, the water may be present in the cement compositions of the present invention in an amount in the range of from about 33% to about 200% by weight of the cement ("bwoc"). In some embodiments, the water may be present in an amount in the range of from about 35% to about 70% bwoc.

The gas utilized in the foamed cement compositions of the present invention may be any gas suitable for foaming a cement composition, including, but not limited to, air or nitrogen, or combinations thereof. Generally, the gas should be present in the foamed cement compositions of the present invention in an amount sufficient to form a foam. In certain embodiments, the gas may be present in the foamed cement compositions of the present invention in an amount in the range of from about 10% to about 80% by volume of the composition.

The foaming and stabilizing additives of the present invention generally comprise a mixture of an alkali salt of an alkyl ether sulfate surfactant, an alkyl or alkene amidopropyl betaine surfactant, an alkyl or alkene amidopropyl dimethylamine oxide surfactant, sodium chloride, and water. Among other things, the foaming and stabilizing additives of the present invention may facilitate the foaming of a non-foamed cement composition and also stabilize the resultant foamed cement composition formed therewith. It is believed that the foaming and stabilizing additive of the present invention may pose less environmental risk, such as to aquatic life, in part because the additive does not contain any organic solvents, e.g., isopropyl alcohol. Generally, the foaming and stabilizing additives of the present invention is present in the foamed cement compositions of the present invention in an amount sufficient to provide a suitable foam. In some embodiments, the foaming and stabilizing additive of the present invention may be present in an amount in the range of from about 0.8% to about 10% by volume of the water ("bvow") present in the foamed cement composition.

The alkali salt of an alkyl ether sulfate surfactant in the foaming and stabilizing additives of the present invention generally comprises a mixture of an alkali salt of a $C_{6-10}$ alkyl ether sulfate surfactant, and an alkali salt of a $C_{2-4}$ alkyl ether sulfate surfactant. The alkali salt may be any suitable alkali salt, including a sodium salt, a potassium salt, an ammonium salt, or a combination thereof. In certain embodiments, the alkali salt is an ammonium salt. The alkali salt of an alkyl ether sulfate surfactant should be present in the foaming and stabilizing additive in an amount sufficient to provide the desired foaming properties. In some embodiments, the alkali salt of an alkyl ether sulfate surfactant may be present in the foaming and stabilizing additive of the present invention in an amount in the range of from about 35% to about 45% by weight of the additive.

Generally, the alkali salt of a $C_{6-10}$ alkyl ether sulfate surfactant may be substituted with an amount of ethylene oxide sufficient to provide the desired foaming properties. In certain embodiments, the alkali salt of a $C_{6-10}$ alkyl ether sulfate surfactant may have in the range of from about 1.5 moles to about 2 moles of ethylene oxide substitution. In some embodiments, the alkali salt of a $C_{6-10}$ alkyl ether sulfate surfactant may be present in the alkali salt of an alkyl ether sulfate surfactant in an amount in the range of from about 65% to about 90% by weight of the alkali salt of an alkyl ether sulfate surfactant.

Generally, the alkali salt of a $C_{2-4}$ alkyl ether sulfate surfactant may be substituted with an amount of ethylene oxide sufficient to provide the desired foaming properties. In certain embodiments, the $C_{2-4}$ alkyl ether sulfate surfactant may have in the range of from about 1.8 moles to about 2.5 moles of ethylene oxide substitution. In certain embodiments, the alkali salt of a $C_{2-4}$ alkyl ether sulfate surfactant may comprise an alkali salt of a $C_4$ alkyl ether sulfate surfactant. In some embodiments, the alkali salt of a $C_{2-4}$ alkyl ether sulfate surfactant may be present in the alkali salt of an alkyl ether sulfate surfactant in an amount in the range of from about 20% to about 35% by weight of the alkali salt of an alkyl ether sulfate surfactant.

In some embodiments, the alkali salt of an alkyl ether sulfate surfactant may further comprise an ammonium sulfate. Where present, the ammonium sulfate is a by product of the neutralization of the acid during production of an ammonium salt. In some embodiments, the ammonium sulfate may be present in an amount in the range of from about 0.1% to about 1.5% by weight of the alkali salt of an alkyl ether sulfate surfactant.

An example of a suitable ammonium salt of an alkyl ether sulfate comprises a mixture of about 74.7% by weight of an ammonium salt of a $C_{6-10}$ alkyl ether sulfate surfactant having about 1.8 moles of ethylene oxide substitution, about 24.9% by weight of an ammonium salt of a $C_4$ alkyl ether sulfate surfactant having about 2 moles of ethylene oxide substitution, and about 0.4% by weight of ammonium sulfate.

The alkyl or alkene amidopropyl betaine surfactant present in the foaming and stabilizing additive of the present invention may be described by Formula I below:

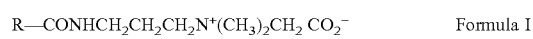
$$R\text{—}CONHCH_2CH_2CH_2N^+(CH_3)_2CH_2\,CO_2^-\qquad\text{Formula I}$$

wherein R is a decyl, a cocoyl, a lauryl, a cetyl, or an oleyl radical. In certain embodiments, the alkyl or alkene amidopropyl betaine surfactant comprises a cocoamidopropyl betaine surfactant. In some embodiments, the alkyl or alkene amidopropyl betaine surfactant may be present in the foaming and stabilizing additive of the present invention in an amount in the range of from about 7.5% to about 12% by weight of the additive.

The alkyl or alkene amidopropyl dimethylamine oxide surfactant present in the foaming and stabilizing additive of the present invention may be described by Formula II below:

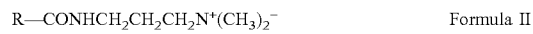
$$R\text{—}CONHCH_2CH_2CH_2N^+(CH_3)_2^-\qquad\text{Formula II}$$

wherein R is a decyl, a cocoyl, a lauryl, a cetyl, or an oleyl radical. In certain embodiments, the alkyl or alkene amidopropyl dimethylamine oxide surfactant comprises a cocoamidopropyl dimethylamine oxide surfactant. In some embodiments, the alkyl or alkene amidopropyl dimethylamine oxide surfactant may be present in the foaming and stabilizing additive of the present invention in an amount in the range of from about 1% to about 5% by weight of the additive.

Generally, the sodium chloride should be included in the foaming and stabilizing additives of the present invention in an amount sufficient to provide the desired freezing and/or pour point depression. In some embodiments, the sodium chloride may be present in an amount in the range of from about 5% to about 15% by weight of the additive.

The water used in the foaming and stabilizing additives of the present invention may be freshwater, saltwater (e.g., water containing one or more salts dissolved therein), brine (e.g., saturated saltwater produced from subterranean formations), or seawater, or combinations thereof. Generally, the water may be from any source, provided that it does not contain an excess of compounds that adversely affect other components in the foaming and stabilizing additive and/or the foamed cement composition. The water should generally be present in the foaming and stabilizing additive in an amount sufficient to dissolve the components thereof as desired. In some embodiments, the water may be present in an amount in the range of from about 35% to about 50% by weight of the additive.

An example of a suitable foaming and stabilizing additive of the present invention comprises a mixture of about 39.55% by weight of an ammonium salt of an alkyl ether sulfate surfactant, about 9.46% by weight of an alkyl or alkene amidopropyl betaine surfactant, about 1.39% by weight of an alkyl or alkene amidopropyl dimethylamine oxide surfactant, about 8.89% by weight of sodium chloride, and about 40.71% by weight of water.

An example of a method of cementing of the present invention comprises providing a foamed cement composition that comprises a hydraulic cement, water, a gas, and a foaming and stabilizing additive of the present invention that comprises mixture of a mixture of an alkali salt of an alkyl ether sulfate surfactant, wherein the alkali salt of the alkyl ether sulfate surfactant comprises a mixture of an alkali salt of a $C_{6-10}$ alkyl ether sulfate surfactant, and an alkali salt of a $C_{2-4}$ alkyl ether sulfate surfactant, an alkyl or alkene amidopropyl betaine surfactant, an alkyl or alkene amidopropyl dimethylamine oxide surfactant, sodium chloride, and water; placing the foamed cement composition in a location to be cemented; and allowing the foamed cement composition to set. The location to be cemented may be any suitable location, included a location above ground or a portion of a subterranean formation, such as between the walls of a well bore and the exterior surface of a pipe string disposed therein.

An example of cementing a portion of a subterranean formation of the present invention comprises providing a foamed cement composition that comprises a hydraulic cement, water, a gas, and a foaming and stabilizing additive of the present invention that comprises mixture of a mixture of an alkali salt of an alkyl ether sulfate surfactant, wherein the alkali salt of the alkyl ether sulfate surfactant comprises a mixture of an alkali salt of a $C_{6-10}$ alkyl ether sulfate surfactant, and an alkali salt of a $C_{2-4}$ alkyl ether sulfate surfactant, an alkyl or alkene amidopropyl betaine surfactant, an alkyl or alkene amidopropyl dimethylamine oxide surfactant, sodium chloride, and water; placing the foamed cement composition in a portion of a subterranean formation; and allowing the foamed cement composition to set.

To facilitate a better understanding of the present invention, the following examples of certain aspects of some embodiments are given. In no way should the following examples be read to limit, or define, the scope of the invention.

EXAMPLE 1

A foaming and stabilizing additive of the present invention was prepared consisting of a mixture of an ammonium salt of an alkyl ether sulfate surfactant (90% active) present in the mixture in an amount of 39.55% by weight of the mixture, a cocoamidopropyl betaine surfactant (30% active) present in an amount of 31.52% by weight of the mixture, a cocoamidopropyl dimethylamine oxide surfactant (30% active) present in an amount of 4.63% by weight of the mixture, sodium chloride present in an amount of 7.31% by weight of the mixture, and water present in the mixture in an amount of 16.99% by weight of the mixture.

The ammonium salt of an alkyl ether sulfate surfactant consisted of a mixture of an ammonium salt of a $C_{6-10}$ alkyl ether sulfate surfactant containing 1.8 moles of ethylene oxide present in an amount of 29.36% by weight of the foaming and stabilizing additive, an ammonium salt of a $C_4$ alkyl ether sulfate surfactant containing 2 moles of ethylene oxide present in an amount of 9.79% by weight of the foaming and stabilizing additive, and ammonium sulfate present in an amount of 0.4% by weight of the foaming and stabilizing additive.

The foaming properties, foam stability and uniformity of the foamed cement after setting was determined for a foamed cement composition comprising Portland Class H cement and water prepared in a multi-blade foam generator having a density of 16.49 pounds per gallon. To a portion of the foamed cement composition, the foaming and stabilizing additive of the present invention was added in an amount of 2% bvow therein. To a second portion of the foamed cement composition, a prior art foaming and stabilizing additive was added in an amount of 2% bvow therein. The prior art foaming and stabilizing additive comprises a mixture of alcohol ether sulfate, an alkyl or alkene amidopropyl betaine, and an alkyl or alkene amidopropyl dimethylamine oxide. This prior art foaming and stabilizing additive is described and claimed in U.S. Pat. No. 6,063,738 issued on May 16, 2000 to Chatterji et al. entitled FOAMED WELL CEMENT SLURRIES, ADDITIVES AND METHODS which is incorporated herein by reference. This prior foaming and stabilizing additive is commercially available as ZONESEAL® 2000 additive, from Halliburton Energy Services, Inc., Duncan, Okla.

The calculated density, 15-second density, and 72-hour compressive strength at 140° F. were determined for each of the foamed cement compositions. Also, the densities of the compositions after setting were determined at the top, middle and bottom of the set compositions. The results of these tests are set forth in TABLE I below.

TABLE I

| Portland Class H Cement and Water (Base Density - 16.49 lb/gal) | | | | | | |
|---|---|---|---|---|---|---|
| Foaming and Stabilizing Additive and % (bvow) | Calculated Density (lb/gal) | 15-Second Density (lb/gal) | 72-Hour Compressive Strength (psi) | Density After Set (lb/gal) | | |
| | | | | Top | Middle | Bottom |
| 2% Prior Art Additive[1] | 11 | 10.22 | 1070 | 10.58 | 9.95 | 9.8 |
| 2% Present Invention Additive | 11 | 10.26 | 969 | 10.18 | 9.77 | 9.77 |

[1]The prior art additive utilized was ZONESEAL ® 2000 additive.

From Table I, it can be seen that this example of foaming and stabilizing additive of the present invention functions substantially as well as the prior art foaming and stabilizing additive.

EXAMPLE 2

The tests described above and set forth in Table I were repeated using a foamed cement composition containing salt, i.e., a cement composition comprising Joppa Class H cement, 15% amorphous silica bwoc, 37% sodium chloride bwoc and water having a density of 15.62 pounds per gallon. The results of the tests are given in Table II below.

TABLE II

Joppa Class H Cement, 15% Amorphous Silica, 37% Sodium Chloride and Water (Base Density - 15.62 lb/gal)

| Foaming and Stabilizing Additive | Calculated Density | 15-Second Density | 72-Hour Compressive Strength | Density After Set (lb/gal) | | |
|---|---|---|---|---|---|---|
| (% bvow) | (lb/gal) | (lb/gal) | (psi) | Top | Middle | Bottom |
| 2% Prior Art Additive[1] | 11.2 | 11.76 | 1038 | 11.02 | 11.11 | 11.20 |
| 2% Present Invention Additive | 11.2 | 11.01 | 876 | 10.57 | 10.70 | 10.71 |

[1]The prior art additive utilized was ZONESEAL ® 2000 additive.

From Table II, it can be seen that this example of a foaming and stabilizing additive of this invention functioned well in a saturated salt solution.

EXAMPLE 3

The tests described in Example 1 above were repeated utilizing a foamed cement composition formed with sea water, i.e., a cement composition comprising Joppa Class H cement and sea water having a base density of 16.62 pounds per gallon. The results of the tests are set forth in Table III below.

TABLE III

Joppa Class H and Sea Water (Base Density - 16.62 lb/gal)

| Foaming and Stabilizing Additive | Calculated Density | 15-Second Density | 72-Hour Compressive Strength | Density After Set (lb/gal) | | |
|---|---|---|---|---|---|---|
| (% bvow) | (lb/gal) | (lb/gal) | (psi) | Top | Middle | Bottom |
| 2% Prior Art Additive[1] | 11 | 10.20 | 1036 | 9.76 | 9.78 | 9.78 |
| 2% Present Invention Additive | 11 | 10.23 | 927 | 10.94 | 10.27 | 9.86 |

[1]The prior art additive utilized was ZONESEAL ® 2000 additive.

From Table III, it can be seen that this example of a foaming and stabilizing additive of the present invention functioned as well or better in sea water than the prior art foaming and stabilizing additive.

EXAMPLE 4

The tests described in Example 1 above were repeated utilizing a foamed cement composition containing slag, i.e., a cement composition containing slag, sodium carbonate in an amount of 8% by weight of the slag and water. The results of the tests are set forth in Table IV below.

TABLE IV

Slag, 8% Sodium Carbonate and Water (Base Density - 15.0 lb/gal)

| Foaming and Stabilizing Additive | Calculated Density | 15-Second Density | 72-Hour Compressive Strength | Density After Set (lb/gal) | | |
|---|---|---|---|---|---|---|
| (% bvow) | (lb/gal) | (lb/gal) | (psi) | Top | Middle | Bottom |
| 2% Prior Art Additive[1] | 11 | 12.02 | 2070 | 12.15 | 12.1 | 12.14 |
| 2% Present Invention Additive | 11 | 11.27 | 2175 | 11.44 | 11.52 | 11.55 |

[1]The prior art additive utilized was ZONESEAL ® 2000 additive.

From Table IV, it can be seen that this example of a foaming and stabilizing additive of the present invention functions as well as the prior art foaming and stabilizing additive.

EXAMPLE 5

The tests described in Example 1 were repeated utilizing a foamed cement composition comprising Class F fly ash, hydrated lime in an amount of 15% by weight of the fly ash, calcium chloride results in an amount of 4% by weight of the fly ash and water. The results of the tests are set forth in Table V below.

TABLE V

Class F Fly Ash, 15% Hydrated Lime, 4% Calcium Chloride and Water (Base Density - 14.08 lb/gal)

| Foaming and Stabilizing Additive | Calculated Density | 15-Second Density | 72-Hour Compressive Strength | Density After Set (lb/gal) | | |
|---|---|---|---|---|---|---|
| (% bvow) | (lb/gal) | (lb/gal) | (psi) | Top | Middle | Bottom |
| 2% Prior Art Additive[1] | 10 | 9.57 | 692 | 9.28 | 9.19 | 9.18 |
| 2% Present Invention Additive | 10 | 9.40 | 681 | 9.17 | 8.88 | 8.87 |

[1]The prior art additive utilized was ZONESEAL ® 2000 additive.

From Table V, it can again be seen that this example of a foaming and stabilizing additive functioned as well as the prior art additive in a fly ash cement composition.

EXAMPLE 6

The tests set forth in Example 1 were repeated utilizing a foamed cement composition comprising Micro Matrix™ hydraulic cement and water. Micro Matrix™ hydraulic cement is commercially available from Halliburton Energy Services, Inc. The results of the tests are set forth in Table VI below.

TABLE VI

Micro Matrix ™ Hydraulic Cement and Water
(Base Density - 12.5 lb/gal)

| Foaming and Stabilizing Additive (% bvow) | Calculated Density (lb/gal) | 15-Second Density (lb/gal) | 72-Hour Compressive Strength (psi) | Density After Set (lb/gal) | | |
|---|---|---|---|---|---|---|
| | | | | Top | Middle | Bottom |
| 2% Prior Art Additive[1] | 10 | 9.46 | 974 | 9.46 | 9.53 | 9.5 |
| 2% Present Invention Additive | 10 | 9.62 | 1034 | 9.52 | 9.6 | 9.59 |

[1] The prior art additive utilized was ZONESEAL ® 2000 additive.

From Table VI, it can again be seen that this example of a foaming and stabilizing additive of this invention functioned as well or better than the prior art foaming and stabilizing additive.

EXAMPLE 7

The tests set forth in Example 1 were repeated utilizing a foamed cement composition comprising calcium aluminate, ASTM Class F fly ash and water as described. in U.S. Pat. No. 6,332,921 issued on Dec. 25, 2001 to Brothers et al., which is incorporated herein by reference. The results of the tests are set forth in Table VII below.

TABLE VII

Calcium Aluminate, ASTM Class F Fly Ash and Water
(Base Density - 15.02 lb/gal)

| Foaming and Stabilizing Additive (% bvow) | Calculated Density (lb/gal) | 15-Second Density (lb/gal) | 72-Hour Compressive Strength (psi) | Density After Set (lb/gal) | | |
|---|---|---|---|---|---|---|
| | | | | Top | Middle | Bottom |
| 2% Prior Art Additive[1] | 11 | 9.46 | 974 | 9.46 | 9.53 | 9.5 |
| 2% Present Invention Additive | 11 | 9.62 | 1034 | 9.52 | 9.6 | 9.59 |

[1] The prior art additive utilized was ZONESEAL ® 2000 additive.

From Table VII it can be seen that this example of a foaming and stabilizing additive of this invention functioned as well as or better than the prior art foaming and stabilizing additive.

EXAMPLE 8

In order to determine the ability of the foaming and stabilizing additive of the present invention to foam at low temperatures, the following experiment was performed. A Joppa Class H cement slurry containing 2% of the foaming and stabilizing additive in an amount of 2% by weight of the water in the cement composition having a density of 16.49 pounds per gallon was foamed at ambient temperature and pressure to a density of 10.24 pounds per gallon (the desired density was 11.0 pounds per gallon). The foamed cement composition was stirred in an atmospheric consistometer for one hour at 50° F. At the end of the stirring, the foamed cement composition had a density of 9.96 pounds per gallon. The slurry was then cured at 55° F. for 72 hours. The experiment was repeated utilizing the prior art foaming and stabilizing additive. The results of the tests are set forth in Table VIII below.

TABLE VIII

Joppa Class H Cement and Water
(Base Density - 16.49 lb/gal)

| Foaming and Stabilizing Additive (% bvow) | Calculated Density (lb/gal) | 15-Second Density (lb/gal) | Density @ 1 Hour (lb/gal) | Density After Set (lb/gal) | | |
|---|---|---|---|---|---|---|
| | | | | Top | Middle | Bottom |
| 2% Prior Art Additive[1] | 11 | 10.21 | 14.33 | 15.42 | 16.49 | 17.47 |
| 2% Present Invention Additive | 11 | 10.24 | 9.96 | 10.24 | 10.32 | 10.84 |

[1] The prior art additive utilized was ZONESEAL ® 2000 additive.

From Table VIII, it can be seen that this example of a foaming and stabilizing additive cured sufficiently at 55° F. The prior art additive destabilized the foamed slurry at 55° F. as indicated by the increased slurry density after set. The prior art additive needs an accelerator to cure as desired at 55° F.

EXAMPLE 9

Foam transfer data using a MACS analyzer was determined for a 16-pound per gallon slurry consisting of Joppa Class H cement, crystalline silica present in an amount of 35% bwoc, amorphous silica present in an amount of 5% bwoc, a non-dispersing set retarder present in an amount of 0.6% bwoc and the foaming and stabilizing additive of the present invention present in an amount of 2% bvow in the cement composition. The non-dispersing retarder utilized is described in U.S. Pat. No. 6,227,294 issued to Chatterji et al. on May 8, 2001 which is incorporated herein by reference.

The cement composition described above was foamed at 200° F. and a pressure of 1000 psi in the MACS analyzer, i.e., an instrument known as a multiple analysis cement slurry (MACS) analyzer. The foamed cement composition in the MACS analyzer was transferred at 200° F. through a manifold system to curing cells that were preheated and charged with nitrogen at the same pressure to which the slurry is subjected in the mixing chamber of the analyzer. The foamed cement composition had density of 10.91 pounds per gallon (desired density was 11.5 pounds per gallon). The foamed cement composition was cured at a temperature of 250° F. for a period of 72 hours. Thereafter the densities of the top, middle and bottom of the cured sample was measured.

The results of these tests are set forth in Table IX below.

TABLE IX

Joppa Class H Cement, Crystalline Silica, Amorphous Silica, Set Retarder and Water (Base Density - 16.0 lb/gal)

| Foaming and Stabilizing Additive and % By Volume of water | Calculated Density (lb/gal) | Transfer Cell Density (lb/gal) | Density After Set (lb/gal) | | |
|---|---|---|---|---|---|
| | | | Top | Middle | Bottom |
| 2% Present Invention Additive | 11.5 | 9.62 | 10.66 | 11.09 | 11.32 |

From Table IX, it can be seen that the sample cured under high temperature and pressure has a minimum variation of density from top to bottom.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method of cementing, comprising:
   providing a foamed cement composition comprising:
   a hydraulic cement;
   water;
   a gas; and
   a foaming and stabilizing additive comprising a mixture of
   an alkali salt of an alkyl ether sulfate surfactant, wherein the alkali salt of the alkyl ether sulfate surfactant comprises a mixture of an alkali salt of a $C_{6-10}$ alkyl ether sulfate surfactant, and an alkali salt of a $C_{2-4}$ alkyl ether sulfate surfactant,
   an alkyl or alkene amidopropyl betaine surfactant having the formula $R-CONHCH_2CH_2CH_2N^+(CH_3)_2CH_2CO_2$, wherein R is a decyl, a cocoyl, a lauryl, a cetyl, or an oleyl radical,
   an alkyl or alkene amidopropyl dimethylamine oxide surfactant having the formula $R-CONHCH_2CH_2CH_2N^+(CH_3)_2O^-$, wherein R is a decyl, a cocoyl, a lauryl, a cetyl, or an oleyl radical,
   sodium chloride, and
   water;
   placing the foamed cement composition in a location to be cemented; and
   allowing the foamed cement composition to set therein.

2. The method of claim 1 wherein the alkali salt of the alkyl ether sulfate surfactant is a sodium salt, a potassium salt, an ammonium salt, or a combination thereof.

3. The method of claim 1 wherein the alkali salt of the $C_{6-10}$ alkyl ether sulfate surfactant has in the range of from about 1.5 about 2 moles of ethylene oxide substitution, and wherein the alkali salt of the $C_{2-4}$ alkyl ether sulfate surfactant has in the range of from about 1.8 about 2.5 moles of ethylene oxide substitution.

4. The method of claim 1 wherein the alkali salt of the $C_{2-4}$ alkyl ether sulfate surfactant comprises an alkali salt of a $C_4$ alkyl ether sulfate surfactant.

5. The method of claim 1 wherein the alkali salt of the alkyl ether sulfate surfactant further comprises an ammonium sulfate.

6. The method of claim 1 wherein the alkali salt of the alkyl ether sulfate surfactant is present in the foaming and stabilizing additive in an amount in the range of from about 35% to about 45% by weight of the foaming and stabilizing additive, wherein the alkyl or alkene amidoproply betaine surfactant is present in the foaming and stabilizing additive in an amount in the range of from about 7.5% to about 12% by weight of the foaming and stabilizing additive, wherein the alkyl or alkene amidopropyl dimethylamine oxide surfactant is present in the foaming and stabilizing additive in an amount in the range of from about 1% to about 5% by weight of the foaming and stabilizing additive, wherein the water in the foaming and stabilizing additive is present in an amount in the range of from about 35% to about 50% by weight of the foaming and stabilizing additive, and wherein the sodium chloride is present in an amount in the range of from about 35% to about 50% by weight of the foaming and stabilizing additive.

7. The method of claim 1 wherein the alkali salt of the alkyl ether sulfate surfactant comprises an ammonium salt of a $C_{6-10}$ alkyl ether sulfate surfactant in an amount in the range of from about 65% to about 90% by weight of the alkali salt of the alkyl ether sulfate surfactant, the ammonium salt of the $C_{6-10}$ alkyl ether sulfate surfactant having in range of from about 1.5 moles to about 2 moles of ethylene oxide substitution; and ammonium salt of a $C_4$ alkyl ether sulfate surfactant in an amount in the range of from about 20% to about 35% by weight of the alkali salt of the alkyl ether sulfate surfactant, the ammonium salt of the $C_4$ alkyl ether sulfate surfactant having in range of from about 1.8 moles to about 2.5 moles of ethylene oxide substitution; and ammonium sulfate in an amount in the range of from about 0.1% to about 1.5% by weight of the alkali salt of the alkyl ether sulfate surfactant.

8. The method of claim 1 wherein the location to be cementing is above ground or a portion of a subterranean formation.

9. The method of claim 1 wherein the location comprises an annulus between a pipe string and the subterranean formation.

10. A method of cementing, comprising:
    introducing a foamed cement composition into a subterranean formation, the foamed cement composition comprising a hydraulic cement, water, a gas, and a foaming and stabilizing additive comprising a mixture of:
    an alkali salt of an alkyl ether sulfate surfactant, wherein the alkali salt of the alkyl ether sulfate surfactant comprises a mixture of an alkali salt of a $C_{6-10}$ alkyl ether sulfate surfactant, and an alkali salt of a $C_{2-4}$ alkyl ether sulfate surfactant;
    an alkyl or alkene amidopropl betaine surfactant having the formula $R-CONHCH_2CH_2CH_2N+(CH_3)_2CH_2CO_2$, wherein R is a decyl, a cocoyl, a lauryl, a cetyl, or an oleyl radical;
    an alkyl or alkene amidopropyl dimethylamine oxide surfactant having the formula $R-CONHCH_2CH_2CH_2N^+(CH_3)_2O^-$, wherein R is a decyl, a cocoyl, a lauryl, a cetyl, or an oleyl radical;
    sodium chloride; and
    water.

11. The method of claim 10 comprising allowing the foamed cement composition to set in the subterranean formation.

12. The method of claim 10 wherein the hydraulic cement comprises at least one of the following; a Portland cement; a pozzolana cement; a gypsum cement; a high alumina content cement; a slag cement; or a silica cement.

13. The method of claim 10 wherein the water in the foamed cement composition comprises at least one of the following: freshwater; saltwater; a brine; or seawater.

14. The method of claim 10 wherein gas comprises at least one of the following: air or nitrogen.

15. The method of claim 10 wherein the foaming and stabilizing additive is present in the foamed cement composition in an amount in the range of from about 0.8% to about 10% by volume of the water in the foamed cement composition.

16. The method of claim 10 wherein the alkali salt of the alkyl ether sulfate surfactant is a sodium salt, a potassium salt, an ammonium salt, or a combination thereof.

17. The method of claim 10 wherein the alkali salt of the $C_{6-10}$ alkyl ether sulfate surfactant has in the range of from about 1.5 to about 2 moles of ethylene oxide substitution, and wherein the alkali salt of the $C_{2-4}$ alkyl ether sulfate surfactant has in the range of from about 1.8 to about 2.5 moles of ethylene oxide substitution.

18. The method of claim 10 wherein the alkali salt of the $C_{2-4}$ alkyl ether sulfate surfactant comprises an alkali salt of a $C_4$ alkyl ether sulfate surfactant.

19. The method of claim 10 wherein the alkali salt of the alkyl ether sulfate surfactant further comprises an ammonium sulfate.

20. The method of claim 10 wherein the alkali salt of the alkyl ether sulfate surfactant is present in the foaming and stabilizing additive in an amount in the range of from about 35% to about 45% by weight of the foaming and stabilizing additive, wherein the alkyl or alkene amidopropyl betaine surfactant is present in the foaming and stabilizing additive in an amount in the range of from about 7.5% to about 12% by weight of the foaming and stabilizing additive, wherein the alkyl or alkene amidopropyl dimethylamine oxide surfactant is present in the foaming and stabilizing additive in an amount in the range of from about 1% to about 5% by weight of the foaming and stabilizing additive, wherein the water in the foaming and stabilizing additive is present in an amount in the range of from about 35% to about 50% by weight of the foaming and stabilizing additive, and wherein the sodium chloride is present in an amount in the range of from about 35% to about 50% by weight of the foaming and stabilizing additive.

21. The method of claim 10 wherein the alkali salt of the alkyl ether sulfate surfactant comprises an ammonium salt of a $C_{6-10}$ alkyl ether sulfate surfactant in an amount in the range of from about 65% to about 90% by weight of the alkali salt of the alkyl ether sulfate surfactant, the ammonium salt of the $C_{6-10}$ alkyl ether sulfate surfactant having in range of from about 1.5 moles to about 2 moles of ethylene oxide substitution; an ammonium salt of a $C_4$ alkyl ether sulfate surfactant in an amount in the range of from about 20% to about 35% by weight of the alkali salt of the alkyl ether sulfate surfactant, the ammonium salt of the $C_4$ alkyl ether sulfate surfactant having in range of from about 1.8 moles to about 2.5 moles of ethylene oxide substitution; and ammonium sulfate in an amount in the range of from 0.1% to about 1.5% by weight of the alkali salt of the alkyl ether sulfate surfactant.

22. The method of claim 10 wherein introducing the cement composition into the formation comprises introducing the cement composition into an annulus between a pipe string and the subterranean formation.

23. The method of claim 22 comprising allowing the cement composition to set in the annulus.

* * * * *